United States Patent
Delaney

(10) Patent No.: US 11,238,237 B2
(45) Date of Patent: Feb. 1, 2022

(54) SYSTEMS AND METHODS FOR DETECTING DATA ASSOCIATED WITH AN ENVIRONMENT AND FOR GENERATING A DESCRIPTION OF THE ENVIRONMENT

(71) Applicant: Lenovo Enterprise Solutions (Singapore) Pte. Ltd., New Tech Park (SG)

(72) Inventor: Mark P. Delaney, Research Triangle Park, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/809,063

(22) Filed: Mar. 4, 2020

(65) Prior Publication Data
US 2021/0279417 A1 Sep. 9, 2021

(51) Int. Cl.
*G06F 40/30* (2020.01)
*G06F 16/9535* (2019.01)
*H04L 29/08* (2006.01)
*G16Y 20/10* (2020.01)
*G06Q 50/16* (2012.01)
*G16Y 40/10* (2020.01)

(52) U.S. Cl.
CPC .......... *G06F 40/30* (2020.01); *G06F 16/9535* (2019.01); *H04L 67/12* (2013.01); *H04L 67/306* (2013.01); *G06Q 50/16* (2013.01); *G16Y 20/10* (2020.01); *G16Y 40/10* (2020.01)

(58) Field of Classification Search
CPC ..... G06F 40/30; G06F 16/9535; H04L 67/12; H04L 67/306; G16Y 20/10; G16Y 40/10; G06Q 50/16
USPC ............................................................ 709/9
See application file for complete search history.

(56) References Cited

U.S. PATENT DOCUMENTS

| | | | |
|---|---|---|---|
| 2016/0070276 A1* | 3/2016 | Joshi | G06F 11/3452 705/14.66 |
| 2016/0071183 A1* | 3/2016 | Joshi | H04M 15/68 705/26.7 |
| 2016/0071219 A1* | 3/2016 | Joshi | G06F 3/0484 705/4 |
| 2019/0340306 A1* | 11/2019 | Harrison | G06N 5/04 |
| 2021/0030226 A1* | 2/2021 | Broz | H04L 67/306 |

OTHER PUBLICATIONS

Massimo, David, User Preference Modeling and Exploitation in IoT Scenarios, Free University of Bozen-Bolzano, Bolzano, Italy, IUI Mar. 7-11, 2018, Tokyo, Japan.

* cited by examiner

*Primary Examiner* — Alan S Chou
(74) *Attorney, Agent, or Firm* — Olive Law Group, PLLC

(57) ABSTRACT

Systems and methods for detecting data associated with an environment and for generating a description of the environment are disclosed. According to an aspect, a system includes multiple electronic devices each being configured to detect data associated with an environment. The system also includes a computing device configured to receive the detected data from the electronic devices. Further, the computing device is configured to determine one or more characteristics of the environment based on the detected data. The computing device is also configured to generate a description of the environment based on the determined one or more characteristics.

20 Claims, 5 Drawing Sheets

# SYSTEMS AND METHODS FOR DETECTING DATA ASSOCIATED WITH AN ENVIRONMENT AND FOR GENERATING A DESCRIPTION OF THE ENVIRONMENT

TECHNICAL FIELD

The presently disclosed subject matter relates generally to electronic devices that detect environmental characteristics. Particularly, the presently disclosed subject matter relates to systems and methods for detecting data associated with an environment and for generating a description of the environment.

BACKGROUND

Electronic devices have become commonplace in many environments or physical spaces such as homes, restaurants, stores, businesses, and even outdoor areas. In a home environment for example, electronic devices for entertainment may be situated throughout a room. For example, a living room may include a display screen, surround sound speakers, a video game system, a digital media player (e.g., Apple TV, Roku, or other such electronic device), a smart speaker, and other electronic devices for providing entertainment. Other rooms in a home may include appliances such as a refrigerator, an oven, a stove, a dishwasher, a washing machine, a dryer, and security system devices.

Increasingly, electronic devices have become "smarter" in that they have the functionality to communicatively connect with other electronic devices, rather than simply operate independently from other electronic devices. These "smart" devices are capable of connecting to other electronic devices via networks, such as local area networks and/or the Internet. Smart devices may sometimes be controlled remotely at least to some extent by another electronic device. For example, a person may use his or her smartphone to check the status of a security system at home. In another example, a person may use a smartphone to unlock a door at home so that someone, such as a repair person, may enter the home. A particular type of smart device is an Internet of Things (IoT) device, which may be referred to as an electronic device within a system of interrelated electronic devices that each have the ability to share its data over a network. Many recently-developed IoT devices and other electronic devices have the ability to detect physical space conditions (e.g., temperature, lighting, sound level, etc. within a room) or other conditions within an environment.

In view of the foregoing, there is a continuing need to advance the usage of interconnected electronic devices. Particularly, there is a continuing need to make use of data acquired by such devices within their environments and the acquired data that has been processed by such devices.

BRIEF DESCRIPTION OF THE DRAWINGS

Figure 1:
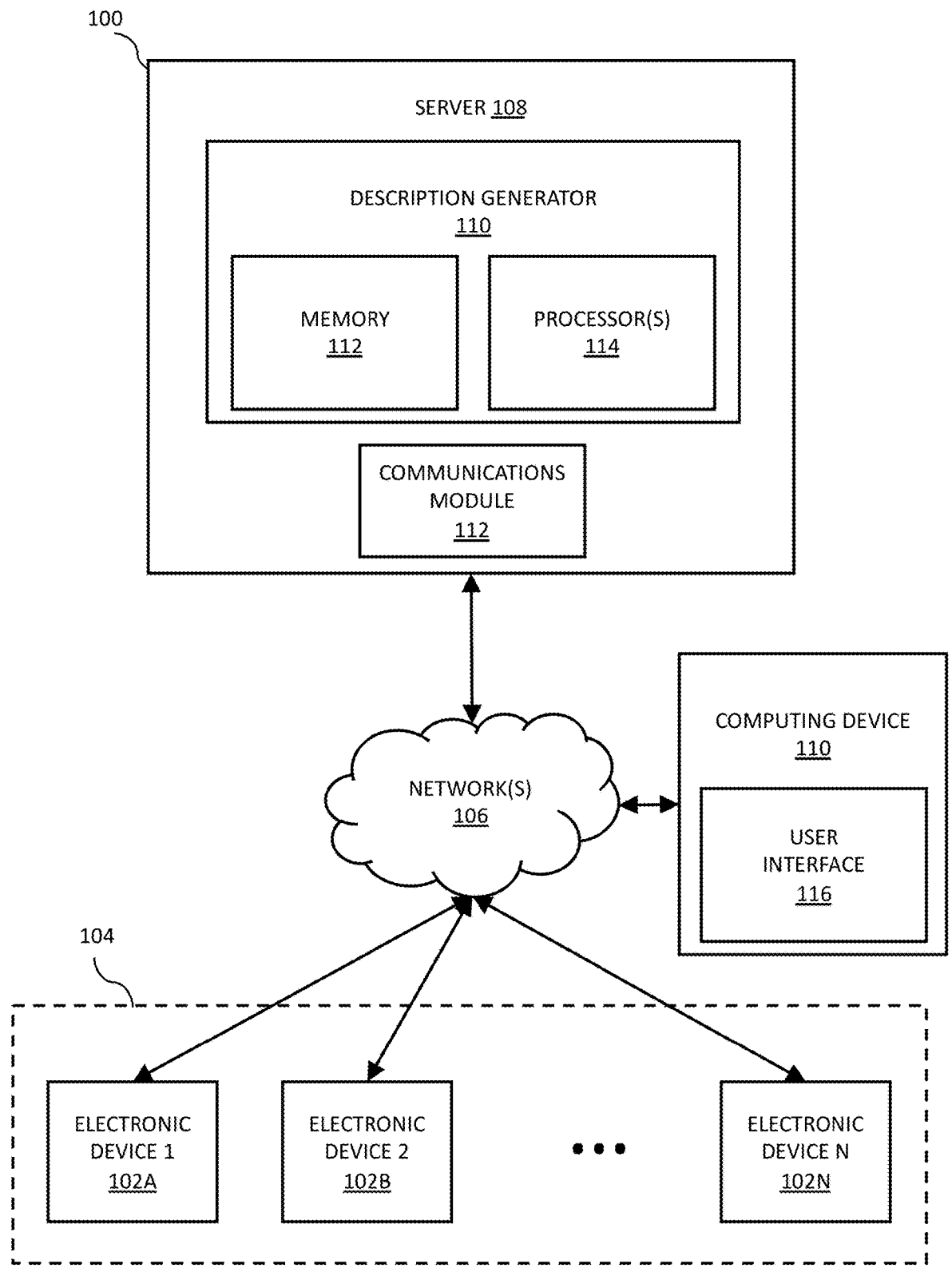
Figure 2:
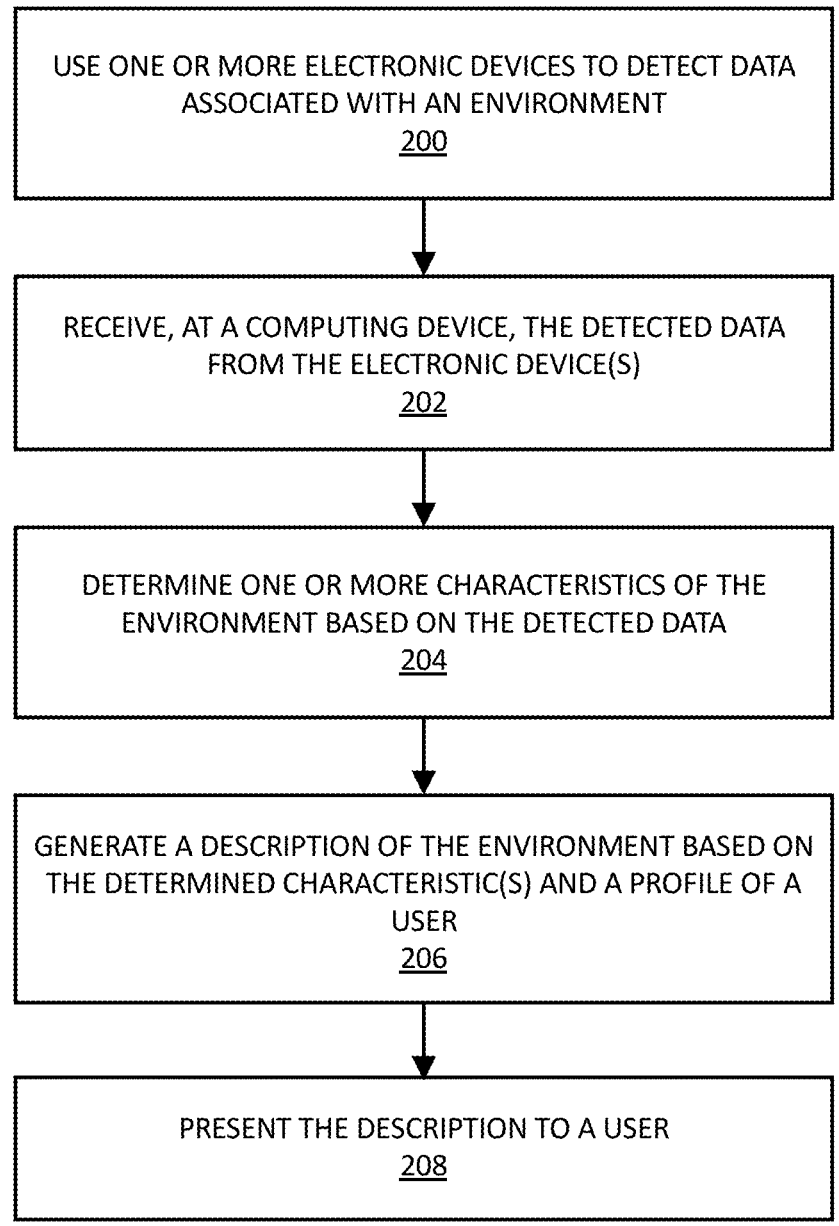
Figure 3:
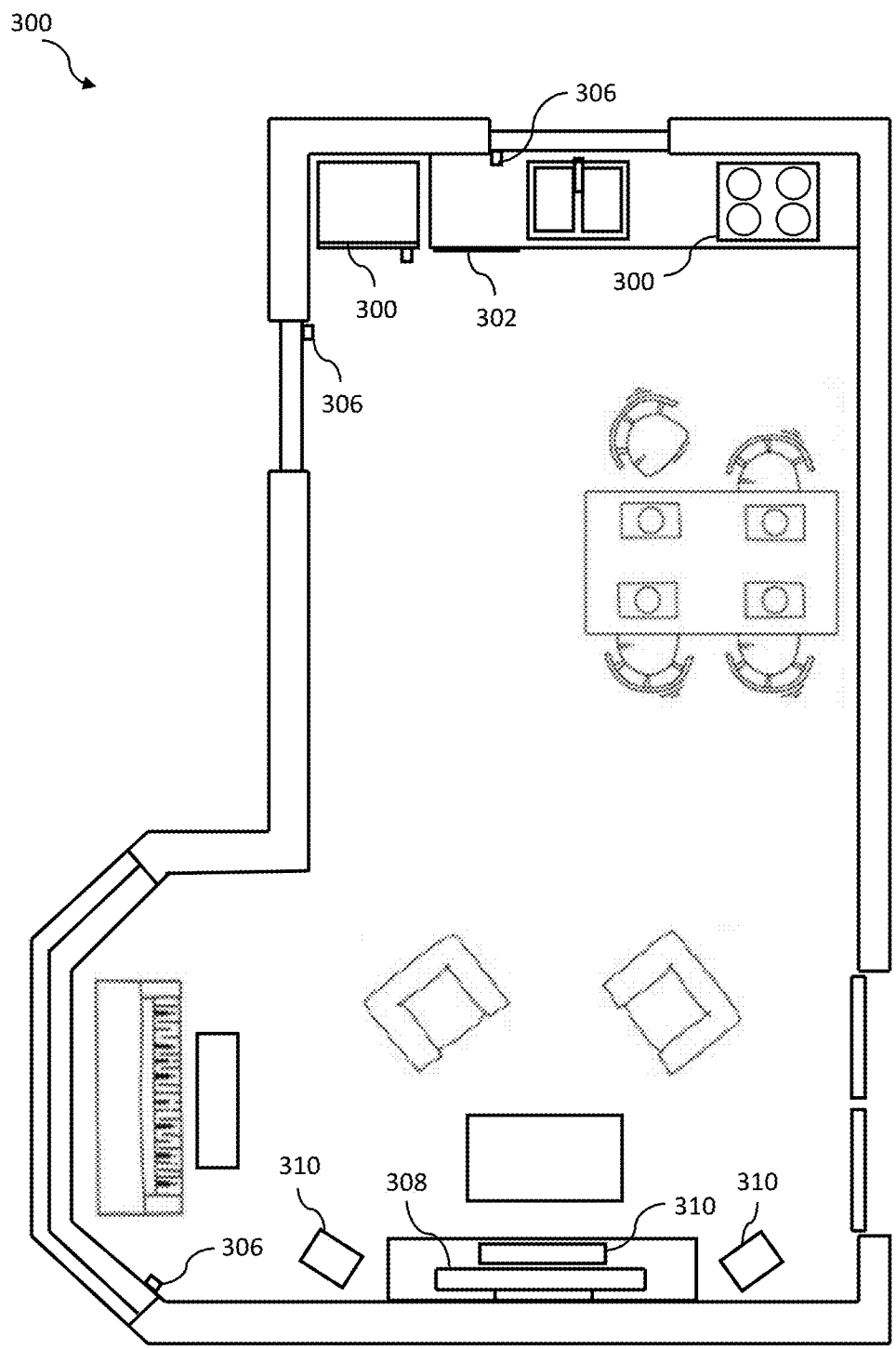
Figure 4:
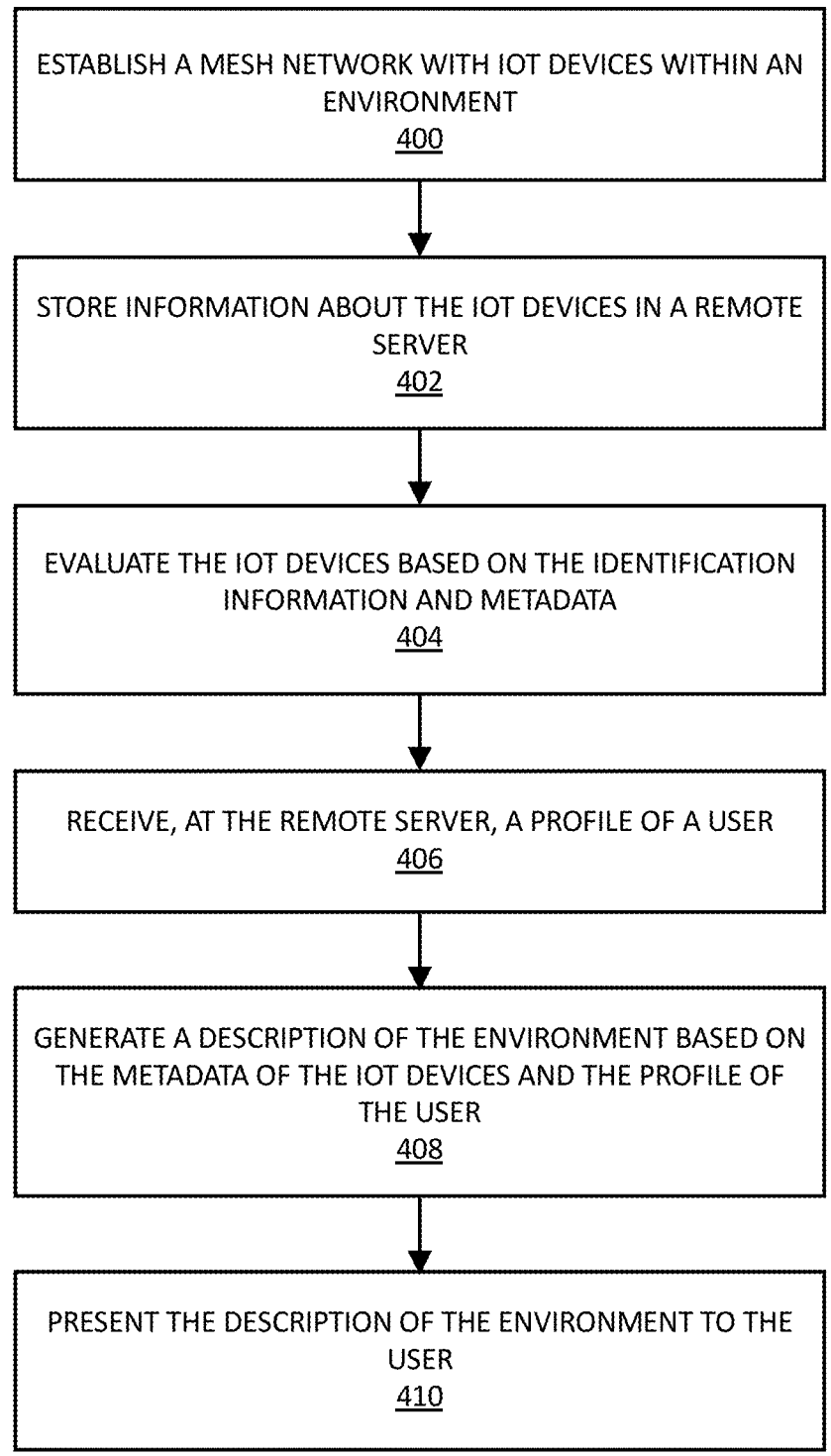
Figure 5:
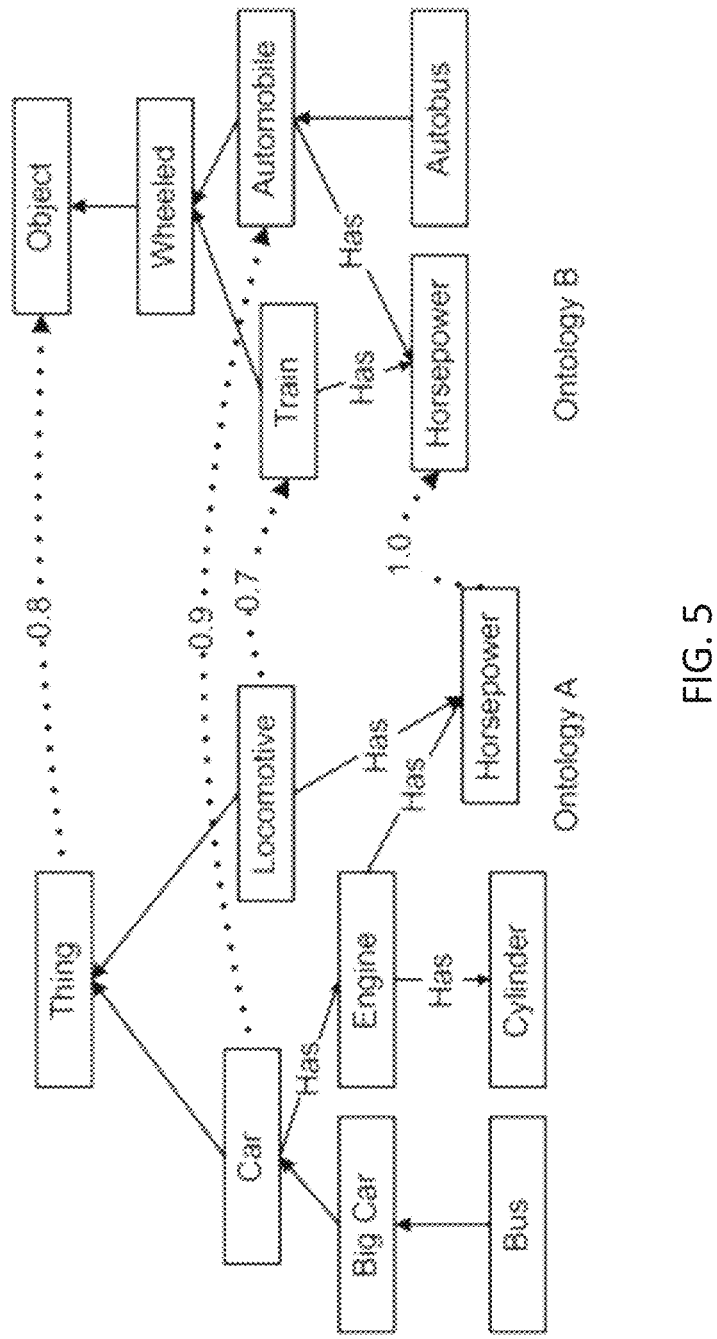

Having thus described the presently disclosed subject matter in general terms, reference will now be made to the accompanying Drawings, which are not necessarily drawn to scale, and wherein:

FIG. 1 is a block diagram of a system for detecting data associated with an environment and for generating a description of the environment in accordance with embodiments of the present disclosure;

FIG. 2 is a flow chart of a method for detecting data associated with an environment and for generating a description of the environment in accordance with embodiments of the present disclosure;

FIG. 3 is a floor plan of a living room and a kitchen with electronic devices operable therein to detect data for generating a description of the living room and the kitchen in accordance with embodiments of the present disclosure;

FIG. 4 is a flow chart of another method for detecting data associated with an environment and for generating a description of the environment in accordance with embodiments of the present disclosure; and FIG. 5 is an example diagram showing the relation of different words for understanding an incomplete data corpus.

SUMMARY

The presently disclosed subject matter includes systems and methods for detecting data associated with an environment and for generating a description of the environment. According to an aspect, a system includes multiple electronic devices each being configured to detect data associated with an environment. The system also includes a computing device configured to receive the detected data from the electronic devices. Further, the computing device is configured to determine one or more characteristics of the environment based on the detected data. The computing device is also configured to generate a description of the environment based on the determined one or more characteristics and a profile of a user.

According to another aspect, a method includes using electronic devices to detect data associated with an environment. The method also includes determining one or more characteristics of the environment based on the detected data. Further, the method includes generating a description of the environment based on the determined one or more characteristics and a profile of a user.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Unless otherwise defined, all technical terms used herein have the same meaning as commonly understood by one of ordinary skill in the art to which this disclosure belongs.

Functional units described in this specification have been labeled as electronic devices. An electronic device may be implemented in programmable hardware devices such as processors, digital signal processors, central processing units, field programmable gate arrays, programmable array logic, programmable logic devices, cloud processing systems, or the like. The electronic devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the electronic device and achieve the stated purpose of the electronic device. In an example, an electronic device may be an IoT device, a smart device, or the like. In another example, an electronic device may be a mobile computing device such as, for example, but not limited to, a smart phone, a cell phone, a pager, a personal digital assistant (PDA), a mobile computer with a smart phone client, or the like. In another example, an electronic device may be any type of wearable computer, such as a computer with a head-mounted display (HMD), or a smart watch or some other smart device. Some of the computer sensing may be part of the fabric of the clothes the user is wearing. An electronic device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable electronic device, such as a computer.

An executable code of an electronic device may be a single instruction, or many instructions, and may even be distributed over several different code segments, among different applications, and across several memory devices. Similarly, operational data may be identified and illustrated herein within the electronic device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of an electronic device or a computing device. Examples include, but are not limited to, read-only memory (ROM) and random access memory (RAM).

The device or system for performing one or more operations on a memory of a computing device or an electronic device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PUP, Perl, or other suitable programming languages.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device or an electronic device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The display object can be displayed on a display screen of a computing device or an electronic device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or times program instructions thereon for causing a processor to carry out aspects of the present disclosure.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

FIG. 1 illustrates a block diagram of a system 100 for detecting data associated with an environment and for generating a description of the environment in accordance with embodiments of the present disclosure. Referring to FIG. 1, the system 100 includes multiple electronic devices 1-N (wherein N indicates that there may be any suitable number of N electronic devices) corresponding to reference numerals 102A-102N, respectively. The electronic devices 102A-102N may be located within an environment 104 or physical space, such as one or more rooms of a house, a restaurant, an outdoor area or the like. The electronic devices 102A-102N may include IoT devices, smart devices, or other electronic devices operable to acquire or detect data related to the environment 104 while operating within the environment 104. Example electronic devices include, but are not limited to, a household appliance, an entertainment device, a smartphone, a television, an electronic sensor, and a speaker. Example data that may be acquired or detected by one of the electronic devices 102A-102N include, but is not limited to, light data (e.g., data indicating an intensity or color of light received by the electronic device, noise data (e.g., data indicating an amplitude or frequency of sound received by the electronic device), device usage data (e.g., data indicating a frequency of use, a time of use, a user identifier associated with the electronic device), timing data (e.g., when data was acquired or received by the electronic device), sensor data (e.g., data indicative of a characteristic of the environment, such as a temperature or humidity of the environment), movement data (e.g., data indicating a movement of the electronic device, such as data generated by a gyroscope), and the like. The data acquired, received, and/or stored by an electronic device may be metadata related to other data acquired, received, and/or stored by the electronic device.

The electronic devices 102A-102N may be distributed within the environment 104 and communicatively connected to one or more networks 106. For example, one or more of the electronic devices 102A-102N may configured for wireless communication via a suitable wireless protocol, such as Zigbee, near field communication (NFC), WI-FI®, light fidelity (LiFi), 3G, or BLUETOOTH®. Alternatively, one or more of the electronic devices 102A-102N may be wired to the network(s) 106 for communication with the network(s) 106). The electronic devices 102A-102N may store received or acquired data, and subsequently communicate the data to the network(s) 106. The network(s) 106 may include a wireless local area network (WLAN), the Internet, a cellular network, the like, and combinations thereof. The electronic devices 102A-102N may communicate with each other via the network(s) 106. Further, electronic devices 102A-102N may communicate with other electronic devices, such as a server 108 and a computing device 110, via the network(s) 106.

The server 108 may be configured to receive detected data from electronic devices operating within an environment, to determine one or more characteristics of the environment based on the detected data; and to generate a description of the environment based on the determined characteristic(s). The server 108 may be, for example, a web server communicatively connected to electronic devices via the Internet and/or one or more other networks. For example, the server 108 may be communicatively connected to electronic devices 102A-102N for receipt of detected data from one or more of the electronic devices 102A-102N. The electronic devices 102A-102N may suitably communicate their respective detected data to the server 108 for further processing.

FIG. 2 illustrates a flow chart of a method for detecting data associated with an environment and for generating a description of the environment in accordance with embodiments of the present disclosure. The method is described by example as being implemented by the system 100 shown in FIG. 1, although it should be appreciated that the method may be suitably implemented by any other suitable system having electronic devices that acquire, receive, or detect data about an environment.

Referring to FIG. 2, the method includes using 200 one or more electronic devices to detect data associated with an environment. For example, electronic devices 102A-102N shown in FIG. 1 may each include one or more sensors that can acquire data from environment 104. In an example, an electronic device may include a light sensor that can detect an intensity of light within an environment. In this example, the light sensor can sense an intensity of light at its location within the environment and subsequently communicate a signal representative of the light intensity to the server. Further, timing information indicating when the light of that intensity was detected. In another example, a sound sensor can detect an amplitude and/or frequency of sound at its location within the environment and subsequently communicate a signal representative of amplitude and/or frequency of the sound to the server. Further, timing information indicating when the sound of that amplitude and/or frequency was detected.

The method of FIG. 2 includes receiving 202, at a computing device, the detected data from the electronic device(s). Continuing the aforementioned example, the server 108 may receive the detected data from one or more of the electronic devices 102A-102N. The server 108 may receive the detected data from the electronic device(s) via the network(s) 106.

The server 108 may include a description generator 110 configured to receive the detected data and store the data in memory 112. The description generator 110 may include hardware, software, firmware, or combinations thereof for implementing the functionality described herein. For example, the description generator 110 may include memory 112 and one or more processors 114 configured to implement the functionality described herein. The server 108 includes a communications module 112 operable to receive data at the server 108 and to send data from the server 108 via the network(s) 106.

The method of FIG. 2 includes determining 204 one or more characteristics of the environment based on the detected data. Continuing the aforementioned example, description generator 110 can determine one or more characteristics of the environment 104 based on the detected data received from one or more of the electronic devices 102A-102N. For example, the sound and light sensors may be situated within a living room, and thus can detect sound and light within the living room. The sound sensor can record time stamps when sound having an amplitude above a predetermined threshold is detected. Similarly, the light sensor can record time stamps when light having an intensity above a predetermined threshold is detected. The sensors can provide the sound amplitude and light intensity information along with the time stamps to the server 108 for receipt by the description generator 110.

Based on the sound amplitude and light intensity information and time stamps, the description generator 110 can determine characteristics of the living room. For example, the description generator 110 may determine days and times when the sound amplitude is above the predetermined threshold, and also when the light intensity is above the predetermined threshold. The description generator 110 may determine recurring patterns of light characteristics of the room if, for example, the light intensity is above the threshold at approximately the same times each day. This may be indicative of how much sun the living room is exposed to. Similarly, the description generator 110 may determine recurring patterns of sound characteristics of the room if, for example, the sound amplitude is above the threshold at approximately the same times each day. This may be indicative of outdoor noise, such as traffic or train noise outside the living room. This determined characteristic information about the living room may be stored in memory 112 by the description generator 110.

The method of FIG. 2 includes generating 206 a description of the environment based on the determined one or more characteristics and a profile of a user. Continuing the aforementioned example, the description generator 110 may generate a description of the environment 104 based on determined characteristic information about the environment 104. In the example of receiving sound amplitude and light intensity information and duration within a living room, the description generator 110 may generate a description of the environment based on timings of when the sound amplitude is above the threshold and when the light intensity is above the threshold. For example, the description generator 110 may apply a natural language rendering technique to generate text description of the living room. For example, the text description of the living room may read: "The living room receives direct sunlight from approximately 7:00 am-3:00 pm in the summer months. Also, a moderate amount of traffic noise can be heard in the living room at approximately 8:00 a.m.-9:00 a.m. and 5:00 p.m.-6:00 p.m. each weekday." Also, the description generator 110 may generate a description of the environment 104 based on a profile of a user. For example, the profile may include indication of the types of preference information that the user is interested in about the environment (e.g., a home for purchase). For example, the user may enter a profile that he or she is interested in modern appliances.

In another example of generating a description, the description generator 110 may determine whether one or more characteristics of the environment matches and information preference of the user. For example, the description generator 110 may determine whether the user's preference for modern appliances matches a characteristic of a kitchen environment that the appliances are less than 5 years old. In response to determining the match, the description generator 110 may generate description of the environment to describe how the one or more characteristics of the environment matches the information preference. Continuing the aforementioned example, text may be added to an initial description of the environment to indicate that the appliances are less than 5 years old.

The method of FIG. 2 includes presenting 208 the description to a user. Continuing the aforementioned example, the description generator 110 may send the generated text description of the living room to computing device 110 for display by its user interface 116. In an example, the server 108 may be a web server for a real estate agency. A website maintained by the real estate agency may maintain a website with information about a house for sale that has the described living room. A user of the computing device 110 may access the website to retrieve the description of the living room of the house for sale. Subsequently, the text description of the living room may be presented to the user so the he or she can make determine his or her interest in the house.

FIG. 3 is a floor plan of a living room and a kitchen with electronic devices operable therein to detect data for generating a description of the living room and the kitchen in accordance with embodiments of the present disclosure. Referring to FIG. 3, the kitchen includes a smart refrigerator 300, a smart dishwasher 302, and a smart stove 304, which are each configured to determine its own usage data and to communicate the usage data to a remote server, such as server 108. Further, both the kitchen and the living room includes light and sound sensors 306 for detecting light intensity and sound frequency and amplitude, and for communicating the detected data to the remote server. The sensors 306 are positioned near doors and windows for detecting outside light and noise that enter the living room and the kitchen. The living room also includes a television 308 and multiple speakers 310 that can determine their own usage data and can communicate the usage data to the remote server. Further, the devices may have stored identification information (e.g., model number and year). The devices may communicate to the server the detected data, usage data, and the identification information. A description generator (e.g., the description generator 110 shown in FIG. 1) residing at the server may receive the data, determine one or more characteristics of the kitchen and the living room based on the data, and generate a description of the kitchen and the living room based on the characteristics.

The following table shows example device information, usage and identification information for each device located in a house.

| Electronic Device | Use Status | Metadata from Device |
| --- | --- | --- |
| General Electric Oven | In Use | 1 hour per week average use, model year 2015, stainless steel, gas range |
| Samsung Television | In Use | Model year 2017, light sensor absorbs 60%+ light 8am-6pm daily, west side of house, little to no noise feedback from microphone |
| Bose Stereo | Off | Average volume 16/50, Frank Sinatra, on east side of house, microphone denotes train regularly throughout the day |

The information in this table may be communicate to a description generator, such as description generator 110 shown in FIG. 1, where it can generate the following text description of the house based on the information:

"This home comes equipped with modern appliances that have barely been broken in. Stainless steel appliances and gas source heat provide a modern and efficient kitchen experience. The bedrooms located on the west side provide a quiet escape, while the east side living area reminds you have the active city steps away with a nearby train station." This description may be presented to a person who is interested in purchasing the house.

FIG. 4 illustrates a flow chart of another method for detecting data associated with an environment and for generating a description of the environment in accordance with embodiments of the present disclosure. The method is described by example as being implemented by the system 100 shown in FIG. 1, although it should be appreciated that the method may be suitably implemented by any other suitable system having electronic devices that acquire, receive, or detect data about an environment.

Referring to FIG. 4, the method includes establishing 400 a mesh network with IoT devices within an environment. For example, IoT devices may be placed within a room, connected via a local area network, and registered with a remote server. The remote server may include a description generator in accordance with embodiments disclosed herein.

The method of FIG. 4 includes storing 402 information about the IoT devices in a remote server. Continuing the aforementioned example, the remote server may receive and store identification information and other metadata of the IoT devices.

The method of FIG. 4 includes evaluating 404 the IoT devices based on the identification information and metadata. Continuing the aforementioned example, the description generator may utilize historical patterns across the IoT devices to generate a corpus of natural language environment descriptions, such as text descriptions about the room.

The method of FIG. 4 includes receiving 406, at the remote server, a profile of a user. Continuing the aforementioned example, the profile may include indication of the types of preference information that the user is interested in about the environment (e.g., a home for purchase). For example, the user may enter a profile that he or she is interested in modern appliances or particular brands of appliances. In other example, the user may enter a preference for particular types of technologies (e.g., lighting or home security), room sizes, wall colors, and the like.

The method of FIG. 4 includes generating 408 a description of the environment based on the metadata of the IoT devices and the profile of the user. Continuing the aforementioned example, the description generator of the remote server may generate a text description of the environment based on the metadata of the IoT devices and the profile of the user. For example, a smart stove and refrigerator may communicate their dates of manufacture to the remote server. Since the user specified having an interest in modern appliances, the text description may be generated to highlight the ages of the stove and refrigerator. In another example, in response to profile indicating preferences for particular technologies, room size, wall color, etc., the text description may be generated such that the description of the indicated preferences are highlighted or otherwise presented in a beginning part of the text.

The method of FIG. 4 includes presenting 410 the description of the environment to the user. Continuing the aforementioned example, the remote server may be sent to the user the text description for display at the user's computing device.

In an example use case, a user is conducting an Internet search for a new apartment. The user desires a quiet space with an abundance of natural light. This profile information may be provided to a remote server including a description generator. The user searches available apartments in the nearby market. The description generator can generate descriptions of the available apartments by use of metadata from electronic devices in the apartments and based on the user's profile in accordance with embodiments of the present disclosure. The description may thus be tailored specifically to the user and the traits in an apartment that the user desires.

In accordance with embodiments, natural language understanding and processing may be utilized for generating description of an environment. Semantic mapping and ontology mapping can be used to disseminate relations of words and relatedness to an input. Example techniques may apply natural language understanding and artificial intelligence to understand concepts with an incomplete data corpus. FIG. 5 illustrates an example diagram showing the relation of different words for understanding an incomplete data corpus.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A system comprising:
a plurality of electronic devices each being configured to detect data associated with an environment; and
a computing device configured to:
receive a profile of a user, the profile including indication of a preference of description of an environment characteristic;
receive the detected data from the electronic devices;
determine one or more characteristics of the environment based on the detected data;
determine that the one of the characteristics is associated with the preference of description; and
generate a natural language description of the environment, wherein a portion of the natural language description includes a portion describing the determined one or more characteristics, and wherein the portion is presented in a beginning part of the natural language description.

2. The system of claim 1, wherein the electronic devices are Internet of Things (IoT) devices configured to communicate the detected data to the computing device via a network.

3. The system of claim 1, wherein the electronic devices are configured to detect the data while operating within the environment.

4. The system of claim 1, wherein the electronic devices comprise one of a household appliance, an entertainment device, a smartphone, a television, an electronic sensor, and a speaker.

5. The system of claim 1, wherein the data comprises one or more of light data, sound data, device usage data, timing data, sensor data, and movement data.

6. The system of claim 1, wherein the data comprises metadata.

7. The system of claim 1, wherein the computing device is configured to generate the natural language description based on the preference of description.

8. The system of claim 7, wherein the profile of the user comprises indication for a preference of one of technologies, room sizes, and wall colors, and
wherein the computing device is configured to generate the natural language description based on the indicated preference.

9. The system of claim 8, wherein the computing device is configured to generate the natural language description to highlight a match of the indication of the preference.

10. The system of claim 1, wherein the profile of the user comprises an information preference of the user, and
wherein the computing device is configured to:
determine the one or more characteristics of the environment matches and information preference of the user; and
generate the natural language description of the environment to describe how the one or more characteristics of the environment matches the information preference in response to determining the match.

11. The system of claim 1, wherein a characteristic comprises one or more of a noise characteristic of the environment, a lighting characteristic of the environment, and a usage measurement of a device.

12. The system of claim 1, wherein the computing device is configured to apply a natural language understanding (NLU) technique to generate the natural language description based on the one or more characteristics.

13. The system of claim 1, wherein the computing device is configured to present the natural language description to a user.

14. The system of claim 13, wherein the natural language description comprises text.

15. A method comprising:
using a plurality of electronic devices to detect data associated with an environment;
receiving a profile of a user, the profile including indication of a preference of description of an environment characteristic;
determining one or more characteristics of the environment based on the detected data;
determining that the one of the characteristics is associated with the preference of description; and
generating a natural language description of the environment, wherein a portion of the natural language description includes a portion describing the determined one or more characteristics, and wherein the portion is presented in a beginning part of the natural language description.

16. The method of claim 15, further comprising generating the natural language description based on the preference of description.

17. The method of claim 16, wherein the profile of the user comprises indication for a preference of one of technologies, room sizes, and wall colors, and
wherein the method further comprises generating the natural language description based on the indicated preference.

18. The method of claim 17, further comprising generating the natural language description to highlight a match of the indication of the preference.

19. The system of claim 15, wherein the profile of the user comprises an information preference of the user, and
wherein the method further comprises:
determining the one or more characteristics of the environment matches and information preference of the user; and
generating the natural language description of the environment to describe how the one or more characteristics of the environment matches the information preference in response to determining the match.

20. A computer program product comprising:
a computer readable storage medium having computer readable program code embodied therewith, the computer readable program code comprising:
computer readable program code configured to use a plurality of electronic devices to detect data associated with an environment;
computer readable program code configured to receive a profile of a user, the profile including indication of a preference of description of an environment characteristic;
computer readable program code configured to determine one or more characteristics of the environment based on the detected data;
computer readable program code configured to determine that the one of the characteristics is associated with the preference of description; and
computer readable program code configured to generate a natural language description of the environment, wherein a portion of the natural language description includes a portion describing the determined one or more characteristics, and wherein the portion is presented in a beginning part of the natural language description.

* * * * *